United States Patent [19]

Reger et al.

[11] 4,360,417

[45] Nov. 23, 1982

[54] DIMENSIONALLY STABLE HIGH SURFACE AREA ANODE COMPRISING GRAPHITIC CARBON FIBERS

[75] Inventors: Arie Reger, Summit; B. Sheldon Sprague, Berkeley Heights, both of N.J.

[73] Assignee: Celanese Corporation, New York, N.Y.

[21] Appl. No.: 165,533

[22] Filed: Jul. 3, 1980

[51] Int. Cl.³ .................... C25B 11/06; C25B 11/12; H01M 4/48

[52] U.S. Cl. ................... 204/290 R; 204/294; 429/44

[58] Field of Search .............. 204/290 R, 294; 429/44

[56] References Cited

U.S. PATENT DOCUMENTS

| | | | |
|---|---|---|---|
| 3,071,637 | 1/1963 | Horn et al. | 29/623.1 |
| 3,072,558 | 1/1963 | Myers et al. | 204/280 |
| 3,214,647 | 10/1965 | Louzos et al. | 361/433 |
| 3,446,607 | 5/1969 | Volk et al. | 428/552 |
| 3,459,917 | 8/1969 | Felts | 219/76 |
| 3,471,383 | 10/1969 | Tiedemann | 204/99 |
| 3,476,604 | 11/1969 | Faber | 75/201 |
| 3,619,382 | 11/1971 | Lupinski | 204/15 |
| 3,632,498 | 1/1972 | Beer | 204/290 F |
| 3,637,468 | 1/1972 | Icxi et al. | 204/15 |
| 3,723,150 | 3/1973 | Druin et al. | 106/307 |
| 3,754,457 | 8/1973 | Erlichmann | 354/179 |
| 3,759,805 | 9/1973 | Chapman et al. | 204/130 |
| 3,764,499 | 10/1973 | Okubo et al. | 204/151 |
| 3,775,520 | 11/1973 | Ram et al. | 264/29 |
| 3,811,943 | 5/1974 | Minck et al. | 429/104 |
| 3,818,082 | 6/1974 | Burns et al. | 264/29 |
| 3,827,964 | 8/1974 | Okubo et al. | 204/257 |
| 3,829,327 | 8/1974 | Omori et al. | 204/294 X |
| 3,852,113 | 12/1974 | Yokota et al. | 429/122 |
| 3,859,187 | 1/1975 | Druin et al. | 204/130 |
| 3,894,884 | 7/1975 | Druin et al. | 423/447 X |
| 3,900,556 | 8/1975 | Clarke | 423/447 |
| 3,915,822 | 10/1975 | Veltman | 204/151 |
| 3,923,629 | 12/1975 | Shaffer | 204/260 |
| 3,925,524 | 12/1975 | Kimmel et al. | 264/29 |
| 3,953,313 | 4/1976 | Levenson | 204/267 |
| 3,954,950 | 5/1976 | Ram et al. | 423/447 |
| 4,040,918 | 8/1977 | Johnson et al. | 204/98 |
| 4,046,663 | 9/1977 | Fleet et al. | 204/280 |
| 4,046,664 | 9/1977 | Fleet et al. | 204/280 |
| 4,061,557 | 12/1977 | Nishizawa et al. | 204/277 |
| 4,108,754 | 8/1978 | Fleet et al. | 204/263 |
| 4,108,755 | 8/1978 | Fleet et al. | 204/263 |
| 4,108,757 | 8/1978 | Fleet et al. | 204/294 |
| 4,112,140 | 9/1978 | Heikel et al. | 427/126 |
| 4,235,695 | 11/1980 | DeNora et al. | 204/268 |

FOREIGN PATENT DOCUMENTS

| 1147853 | 4/1969 | United Kingdom . |
|---|---|---|
| 1240793 | 7/1971 | United Kingdom . |
| 1244711 | 9/1971 | United Kingdom . |
| 1434824 | 5/1976 | United Kingdom . |

*Primary Examiner*—F. Edmundson
*Attorney, Agent, or Firm*—Burns, Doane, Swecker & Mathis

[57] ABSTRACT

A relatively high surface area electrode is provided which can be utilized as an anode for extended periods of time without replacement in an electrolytic reaction in which oxygen is evolved. The anode of the present invention comprises a carbonaceous fibrous material (e.g. a fabric, tow, or felt) which bears a surface coating of a mixed crystal material consisting essentially of ruthenium oxide and titanium oxide. The anode is particularly suited for usage in the removal of harmful contaminants (i.e. organic or inorganic contaminants) from waste streams even when present in relatively low concentrations.

8 Claims, 8 Drawing Figures

DIMENSIONALLY STABLE HIGH SURFACE AREA ANODE COMPRISING GRAPHITIC CARBON FIBERS

BACKGROUND OF THE INVENTION

Heretofore electrodes for use in electrolytic reactions have been formed from a wide variety of electrically conductive materials and provided in a wide variety of configurations. For efficient commercial utilization it is, of course, essential that the electrode be capable of extended usage without loss of its dimensional integrity. Electrode replacement when necessary commonly has required the complete shutdown of the electrolytic process and often a substantial expenditure of capital to provide the replacement electrode. Accordingly, electrode selection and expense commonly have had a large economic impact in many electrolytic processes.

Electrodes composed of block or fibrous carbon long have been known. Representative disclosures of the use of carbon fibers in electrolytic cells include U.S. Pat. Nos. 3,071,637; 3,072,558; 3,214,647; 3,459,917; 3,471,383; 3,476,604; 3,619,382; 3,637,468; 3,759,805; 3,764,499; 3,811,943; 3,827,964; 3,829,327; 3,852,113; 3,915,822; 3,923,629; 3,953,313; 4,046,663; 4,046,664; 4,061,557; 4,108,754; 4,108,755; and 4,108,757; and British Pat. Nos. 1,147,853; 1,240,793; 1,244,711; and 1,434,824. It has been recognized, however, that if carbon is used as an anode in an electrochemical cell such carbon is subject to an oxidative attack which leads to its complete destruction over a period of time which tends to be directly related to the cross-sectional area. Accordingly, such destruction commonly occurs at a relatively rapid rate if the carbon is present in a fibrous configuration and employed as an anode rather than a cathode. See U.S. Pat. No. 3,471,383.

Heretofore, dimensionally stable anodes for use in such environments commonly have been of relatively low surface area and formed all or in part from expensive noble metals or from an electrically conductive substrate such as graphite or a titanium metal base which bears a protective coating. While the noble metal electrodes commonly possess the desired stability, undesirable overvoltage characteristics are commonly exhibited. See, for instance, U.S. Pat. No. 3,446,607 wherein a block of graphite is coated with iridium, or U.S. Pat. No. 3,632,498 wherein a block of an electrically conductive base is coated with a mixed crystal material (e.g. oxides of ruthenium and titanium). Any break in the protective coating would provide an opening for the destruction of a graphite substrate or result in the formation of a non-conductive titanium oxide coating on a titanium base. Heretofore, anodes commonly have been commercially utilized in the chloralkali industry wherein expanded titanium metal bears an appropriate protective coating. Such coated titanium anodes have been found to be superior to carbon electrodes in that they exhibit relatively long useful lives. However, such electrodes have been of relatively low surface area (e.g. below about 25 $cm^2/cm^3$ and commonly below 3 $cm^2/cm^3$).

There has remained a need for a dimensionally stable anode of relatively high surface area. Such high surface area necessary for optimum contact with the electrolyte would appear to require a relatively frail structure which would be expected to militate against the desired dimensional stability necessary for extended usage.

It is an object of the present invention to provide a novel anodically stable relatively high surface area electrode.

It is an object of the present invention to provide an anode comprising carbon fibers which is capable of retaining its dimensional stability during extended periods of use.

It is an object of the present invention to provide an anode comprising carbon fibers which exhibits substantial stability when used in an environment in which oxygen is evolved.

It is an object of the present invention to provide a relatively high surface area anode which is capable of being produced on a relatively economical basis.

It is an object of the present invention to provide an anode which particularly is suited for usage in the removal of harmful contaminants from waste streams, even when present in relatively low concentrations.

It is a further object of the present invention to provide a relatively high surface area anode of relatively long life having relatively low overvoltage characteristics.

It is another object of the present invention to provide a dimensionally stable anode which during operation necessitates a lower energy consumption because of its relatively high surface area which enables the cell to be operated at a lower voltage.

These and other objects, as well as the scope, nature, and utilization of the present invention will be apparent to those skilled in the art from the following detailed description and appended claims.

SUMMARY OF THE INVENTION

A dimensionally stable anode of a relatively high surface area of at least 3,000 $cm^2/cm^3$ is provided which is capable of extended usage in an electrolytic reaction in which oxygen is evolved comprising a carbonaceous fibrous material containing at least 90 percent carbon by weight which bears a coating of a mixed crystal material consisting essentially of ruthenium oxide and titanium oxide.

DESCRIPTION OF PREFERRED EMBODIMENTS

Figure 1:
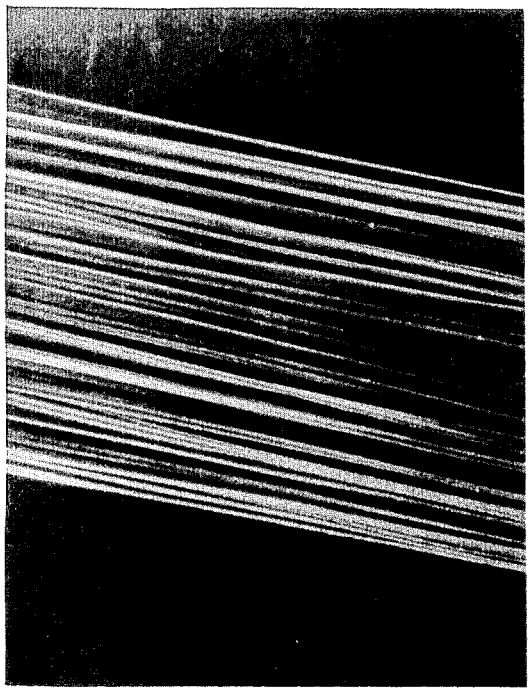
FIG. 1 is a photograph made with the aid of a scanning electron microscope at a magnification of 200× of a tow of approximately 300 carbon filaments having a denier per filament of approximately 0.9 substantially identical to that utilized in the Example prior to the application of the coating of mixed crystal material consisting essentially of ruthenium oxide and titanium oxide.
Figure 2:
FIG. 2 is a photograph made with the aid of a scanning electron microscope at a magnification of 2,000× of filaments of a portion of the tow of FIG. 1 prior to the application of the coating of mixed crystal material consisting essentially of ruthenium oxide and titanium oxide.

An electrically conductive carbonaceous fibrous material containing at least 90 percent carbon by weight forms an essential part of the dimensionally stable anode of the present invention. Such carbonaceous fibrous material contains at least 95 percent carbon by weight (e.g. at least 99 percent carbon by weight) in a preferred embodiment. Such carbon fibers are commercially available and may exhibit either an amorphous or predominantly graphitic X-ray diffraction pattern. In a preferred embodiment such fibrous materials exhibit a predominantly graphitic x-ray diffraction pattern which commonly is accompanied by increased electrical conductivity characteristics over those inherently exhibited by fibers composed exclusively of amorphous carbon. The carbonaceous fibrous materials may be formed by the thermal treatment of any one of a variety of organic polymeric materials in accordance with techniques known in the art. Representative techniques for forming the carbon fibers for use in the present invention are disclosed in commonly assigned U.S. Pat. Nos. 3,775,520; 3,818,082; 3,900,556; 3,925,524; and 3,954,950.

Prior to the application of the mixed crystal material as described hereafter the carbonaceous fibrous material may have its surface characteristics modified in order to facilitate enhanced adhesion with a coating material in accordance with techniques known in the art. Representative techniques which can be utilized to surface treat the carbon fibers are preliminarily disclosed in commonly assigned U.S. Pat. Nos. 3,723,150; 3,754,457; 3,859,187; and 3,894,884.

The carbonaceous fibrous material commonly exhibits a denier per filament of approximately 0.5 to 2 prior to the application of the mixed crystal material as described hereafter, and is provided in a multifilamentary form. A relatively high surface area is inherently exhibited by such fibrous materials. The fibrous configuration selected will be influenced by the specific environment in which the resulting anode is intended to be employed. Preferred configurations for the fibrous material as well as that of the resulting dimensionally stable anode upon the application of the mixed crystal material are that of a fabric, multifilament tow, or a felt.

It surprisingly has been found that a mixed crystal material consisting essentially of ruthenium oxide and titanium oxide will adhere tenaciously to the surface of the carbonaceous fibrous material to yield a dimensionally stable anode of a relatively high surface area which is capable of extended usage in an electrolytic reaction in which oxygen is evolved while exhibiting excellent overvoltage characteristics. Alternatively, an electrically conductive intermediate coating, such as a conductive adhesion promoting layer, can be employed so long as it adheres to the surface of the carbonaceous fibrous material and the mixed crystal material adheres well thereto.

Such coating of mixed crystal material preferably is applied by padding a solution containing both ruthenium chloride and tetrabutyl-ortho-titanate (or other appropriate compounds) directly to the carbonaceous fibrous material, evaporating the solvent, and then heating the same in air (e.g. at 400° to 650° C. and preferably 400° to 550° C.) until the desired mixed crystal oxides are formed in intimate association with each other. A particularly preferred heating temperature is 450° to 500° C. The solution may be applied by any technique commonly employed in the textile finishing art including spraying. The coating following heating is considered to be of a mixed crystal nature since the lattices of ruthenium oxide and titanium oxide are intertwined. The mixed crystal nature of the coating can be confirmed by conventional x-ray diffraction analysis. The coating preferably comprises approximately 42 to 50 percent by weight ruthenium oxide and approximately 50 to 58 percent by weight titanium oxide. Representative techniques for forming the coating are disclosed in U.S. Pat. No. 3,632,498 and in "Morphology of Dimensionally Stable Anodes" by K. J. O'Leary and T. J. Navin of the Chlorine Bicentennial Symposium 1974, pages 174 to 186 which are herein incorporated by reference. Neither of these disclosures contemplated the application of the coating to a carbonaceous fibrous material to yield the dimensionally stable anode of the present invention.

The mixed crystal material preferably is applied in a plurality of layers or increments (e.g. 6 to 12 layers) with the drying and heating being carried out following each application of the solution from which the coating is derived. The resulting coating of mixed crystal material is continuous in the sense that there is no exposure of the carbon fibers to the electrolyte in which the anode is employed.

The resulting outer coating of mixed crystal ruthenium oxide and titanium oxide commonly has a thickness of at least 25 microns (e.g. 25 to 100 microns or more) and additionally is dispersed between adjoining filaments. The relatively high surface area of the resulting anode is at least 3,000 cm$^2$/cm$^3$, and preferably approximately 5,000 to 10,000 cm$^2$/cm$^3$.

For the purposes of the present invention the relatively high surface area of the resulting anode is quantified (except when indicated hereafter) by a standard technique involving zinc ion adsorption. This technique is believed to give a good indication of the surface area which is available for electrochemical reaction. A mixture of zinc chloride and ammonium chloride solutions is prepared and adjusted to approximately neutral pH with a buffer. The zinc ion concentration is accurately determined by atomic adsorption spectroscopy analysis. The anode is immersed in the zinc ion containing solution and zinc ions adsorb on the surface thereof in a monolayer. The anode is retained in the zinc ion containing solution for approximately 20 hours to insure that equilibrium has been achieved. The concentration of zinc ions remaining in solution next is accurately determined by atomic adsorption spectroscopy analysis. The surface area occupied by the absorbed zinc ions is computed on the basis that each zinc ion occupies 20 Å$^2$. However, when determining a current density employed with an anode, the surface area is considered to be the simple geometrical surface area as is common in the art. More specifically, the plurality of coated graphite filaments referred to in the example possessed a substantially cylindrical configuration, and the surface area was calculated for a simple cylinder of the same diameter as the resulting anode.

The dimensionally stable anode of the present invention can be used to advantage in any electrolytic reaction wherein an anode of good accessibility and relatively high surface area is desirable. For instance, the anode is particularly suited for usage in the removal of harmful organic or inorganic contaminants from waste streams even when present in relatively low concentrations. Cyanides can be removed from diluted streams, or Cr (III) oxidized to Cr(VI).

The following example is given as a specific illustration of the invention. It should be understood, however, that the invention is not limited to the specific details set forth in the example.

EXAMPLE

A tow of approximately 300 substantially parallel filaments having a denier per filament of approximately 0.9 substantially identical to that of FIG. 1 and containing approximately 99 percent carbon by weight and exhibiting a predominantly graphitic x-ray diffraction pattern was selected for use in the formation of the dimensionally stable anode of the present invention. The tow was commercially available from the Celanese Corporation under the designation Celion GY-70, and measured approximately 4.5 inches in length. It had been formed by the thermal treatment of an acrylic fibrous material, and had received no surface treatment.

A paste was prepared consisting of 1 gram ruthenium chloride, RuCl$_3$; 3 cc. of tetrabutyl-ortho-titanate, [CH$_3$(CH$_2$)$_3$O]$_4$Ti; 6.2 cc. butanol; and 0.4 cc. hydrochloric acid (36 percent). Initially the butanol was added to the mixture of ruthenium chloride and hydrochloric acid with stirring until complete dissolution of the solids was accomplished. The tetrabutyl-ortho-titanate was then added with stirring to form the uniform paste which was brown and viscous.

Figure 3:
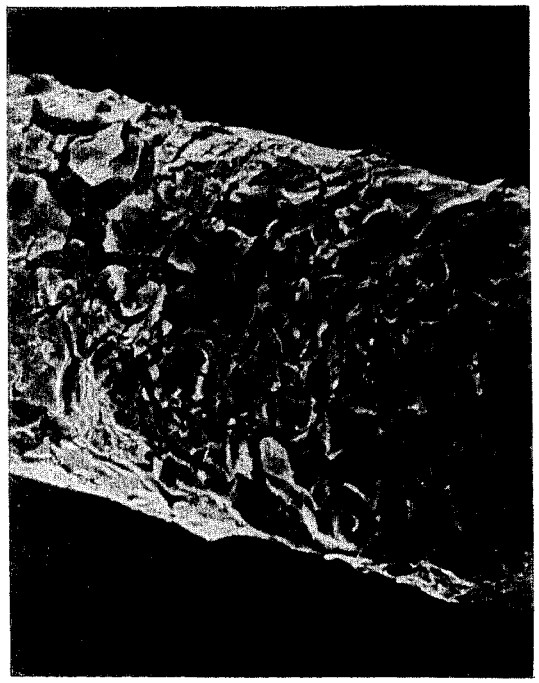
FIG. 3 is a photograph made with the aid of a scanning electron microscope at a magnification of 200× of a tow of carbon filaments substantially identical to that of FIG. 1 following the application of a complete and continuous coating of the mixed crystal material consisting essentially of ruthenium oxide and titanium oxide as described in the Example. The resulting coated tow has a relatively high surface area of approximately 6,000 $cm^2/cm^3$ and is capable of extended utilization as a dimensionally stable anode in an electrolytic reaction in which oxygen is evolved.
Figure 4:
FIG. 4 is a photograph made with the aid of a scanning electron microscope at a magnification of 2,000× of a portion of the filaments as illustrated in FIG. 2 following the application of a complete and continuous coating of the mixed crystal material consisting essentially of ruthenium oxide and titanium oxide as described in the Example.

The paste next was painted onto the surface of the tow of carbon filaments to form a thin continuous coating. The filaments were then dried by a stream of hot air at a temperature of approximately 200° C. and heated in forced air oven at 450° C. for 7 to 8 minutes. During such drying and heating the solvent was evaporated and a coating of mixed crystals of ruthenium oxide and titanium oxide was formed on the surface of the carbon fiber tow. This procedure was repeated seven more times in order to form a final complete and continuous coating of the mixed crystals which was applied in eight increments or superimposed layers. The coated tow is illustrated in FIG. 3. The mixed oxide coating was black in appearance and the product was approximately four times heavier than the uncoated tow. The outer mixed crystal coating possessed a thickness of approximately 80 microns and additionally was dispersed between adjoining filaments. The resulting coated carbon fiber tow possessed a relatively high surface area of approximately 6,000 cm$^2$/cm$^3$ which was enhanced by irregular surface morphology.

Figure 5:
FIG. 5 is a photograph made with the aid of a scanning electron microscope at a magnification of 2,000× of the broken ends of carbon filaments substantially identical to those of FIGS. 1 and 2 following usage as an anode for a limited period of only 11 to 12 hours at a current density of 5 mA/cm$^2$ as described in the Example.
Figure 6:
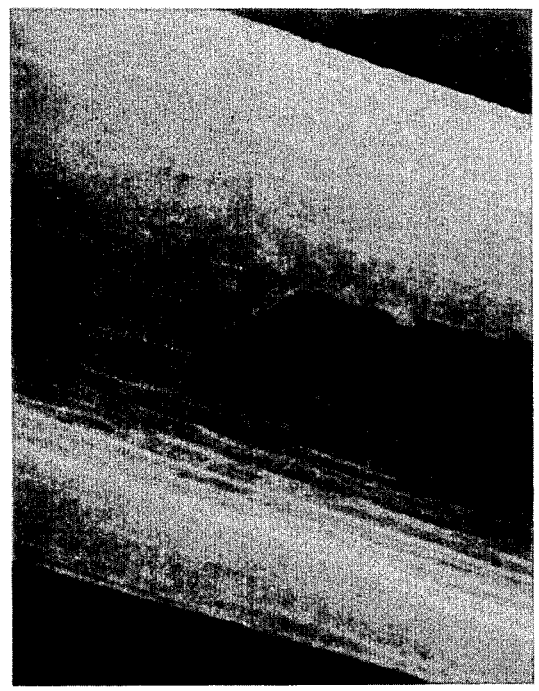
FIG. 6 is a photograph made with the aid of a scanning electron microscope at a magnification of 10,000× of a broken portion of a single carbon filament substantially identical to those illustrated in FIGS. 1 and 2 following usage as an anode for a limited period of only 11 to 12 hours at a current density of 5 mA/cm$^2$ as described in the Example.

Two side-by-side strands of the coated material next were attached to a polytetrafluoroethylene electrode holder and connected to a brass rod. The resulting holder with the coated fibers was placed in a cell containing 800 ml. of 0.1 N sodium hydroxide solution. The length of the resulting electrode in contact with the solution was 4.0 cm. The brass rod was connected to the positive connector of a galvanostat constant current power supply. A high density graphite rod of 0.25 inch diameter which served as a counter electrode was placed in the solution and connected to the negative connector of the galvanostat. A current density of 5 mA/cm$^2$ was supplied to the system for 2700 hours and then was deliberately discontinued. During this period of time oxidation of water took place at the anode with the evolution of oxygen gas. The voltage across the cell was occasionally measured during the test to see if a change in the electrode had taken place. No such change was observed. Accordingly, the service life of the anode under such conditions was considered to be considerably in excess of 2700 hours. For comparative purposes uncoated carbon filaments similar to those illustrated in FIG. 1 were tested as an anode. After approximately 10 to 16 hours a drop in current was noted and the electrode failed. Broken filaments of the electrode are illustrated in FIGS. 5 and 6.

Additional runs were carried out at higher current densities of 100 mA/cm$^2$, 150 mA/cm$^2$, 200 mA/cm$^2$, and 400 mA/cm$^2$, and a comparison of the anode useful life was made with that of uncoated carbon filaments. The average results observed are summarized in the following table.

| Current Density (mA/cm$^2$) | Un-Coated Carbon Filaments Time to Failure | Mixed Crystal Coated Carbon Filaments Time to Failure |
| --- | --- | --- |
| 5 | 10 to 16 hours | >2700 hours |
| 100 | 30 to 40 minutes | 1400 hours |
| 150 | 18 to 19 minutes | 1000 hours |
| 200 | 8 to 9 minutes | 400 hours |
| 400 | 3 to 4 minutes | 100 hours |

Figure 7:
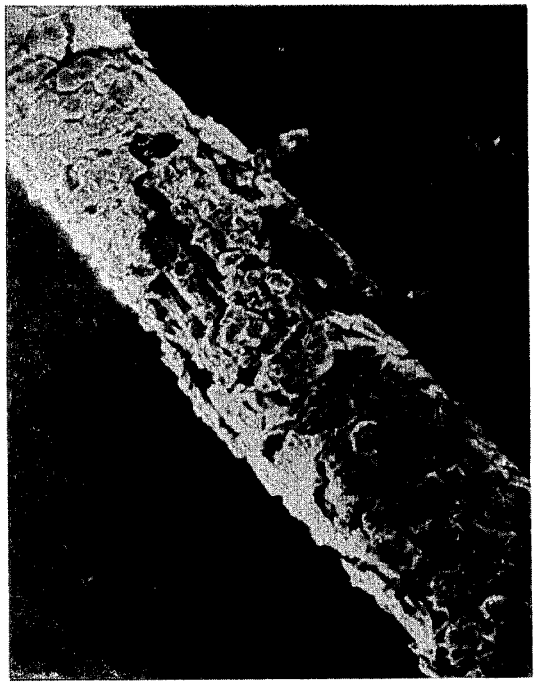
FIG. 7 is a photograph made with the aid of a scanning electron microscope at a magnification of 100× of a tow of carbon filaments following application of a coating of the mixed crystal material consisting essentially of ruthenium oxide and titanium oxide wherein failure of the coating is beginning to be apparent following extended usage for approximately 430 hours as an anode at a current density of 200 mA/cm$^2$ as described in the Example.
Figure 8:
FIG. 8 is a photograph made with the aid of a scanning electron microscope at a magnification of 5,000× of a portion of the coated filaments as illustrated in FIG. 7 wherein the failure of the coating is apparent following extended usage for approximately 430 hours as an anode at a current density of 200 mA/cm$^2$ as described in the Example.

The greatly extended useful life of the dimensionally stable anode of the present invention is apparent from this data. While operating at a current density of 100 mA/cm$^2$ approximately 40 grams of oxygen per square centimeter of electrode area were generated. FIGS. 7 and 8 illustrate the onset of the failure of the mixed crystal coating which occurs only after extended usage.

Although the invention has been described with preferred embodiments, it is to be understood that variations and modifications may be resorted to which will be apparent to those skilled in the art. Such variations and modifications are to be considered within the scope and purview of the claims appended hereto.

We claim:

1. A dimensionally stable anode of a relatively high surface area of at least 3,000 $cm^2/cm^3$ capable of extended usage in an electrolytic reaction in which oxygen is evolved comprising a carbonaceous fibrous material which exhibits a predominantly graphitic x-ray diffraction pattern and contains at least 95 percent carbon by weight which bears a coating of a mixed crystal material consisting essentially of ruthenium oxide and titanium oxide.

2. A dimensionally stable anode of a relatively high surface area in accordance with claim 1 which exhibits a surface area of at least 5,000 $cm^2/cm^3$.

3. A dimensionally stable anode of a relatively high surface area in accordance with claim 1 wherein said carbonaceous fibrous material has the configuration of a fabric.

4. A dimensionally stable anode of a relatively high surface area in accordance with claim 1 wherein said carbonaceous fibrous material has the configuration of a multifilament tow.

5. A dimensionally stable anode of a relatively high surface area in accordance with claim 1 wherein said carbonaceous fibrous material has the configuration of a felt.

6. A dimensionally stable anode of a relatively high surface area in accordance with claim 1 wherein said coating consists of a plurality of superimposed layers having a total thickness of approximately 25 to 100 microns.

7. A dimensionally stable anode of a relatively high surface area in accordance with claim 1 wherein said coating of mixed crystal material comprises approximately 42 to 50 percent by weight ruthenium oxide and approximately 50 to 58 percent by weight titanium oxide.

8. A dimensionally stable anode of relatively high surface area in accordance with claim 1 wherein said carbonaceous fibrous material exhibits a denier per filament of approximately 0.5 to 2.

* * * * *